US006951668B2

(12) United States Patent
Guimont et al.

(10) Patent No.: US 6,951,668 B2
(45) Date of Patent: Oct. 4, 2005

(54) METHOD OF COATING CUTTING EDGES

(75) Inventors: Raymond Guimont, Guilford, CT (US); Randy Nicolgai, Shelton, CT (US)

(73) Assignee: Eveready Battery Company, Inc., St. Louis, MO (US)

( * ) Notice: Subject to any disclaimer, the term of this patent is extended or adjusted under 35 U.S.C. 154(b) by 287 days.

(21) Appl. No.: 10/401,225

(22) Filed: Mar. 27, 2003

(65) Prior Publication Data

US 2003/0224115 A1 Dec. 4, 2003

Related U.S. Application Data

(60) Provisional application No. 60/384,322, filed on May 30, 2002.

(51) Int. Cl.$^7$ ................................................. B05D 3/00
(52) U.S. Cl. ........................ 427/553; 427/375; 427/595
(58) Field of Search ................................ 427/375, 553, 427/595

(56) References Cited

U.S. PATENT DOCUMENTS 4,960,643 A    10/1990   Lemelson

*Primary Examiner*—Bernard Pianalto
(74) *Attorney, Agent, or Firm*—McCormick, Paulding & Huber LLP

(57) ABSTRACT

A process for applying a coating containing a fusible material to a cutting edge of a cutting tool includes heating the fusible material to fuse the same, the heating being provided by microwave energy.

8 Claims, No Drawings

METHOD OF COATING CUTTING EDGES

CROSS REFERENCE TO RELATED APPLICATIONS

This application is entitled to the benefit of and incorporates by reference essential subject matter disclosed in Provisional Patent Application No. 60/384,322 filed on May 30, 2002 in the name of Warner-Lambert Company.

FIELD OF THE INVENTION

The present invention relates to the manufacture of edged tools and other cutting instruments, e.g., razor blades, knives, and the like. More particularly, the present invention relates to a method of applying a coating to the cutting edge(s) of such tools and instruments.

BACKGROUND OF THE INVENTION

An edged tool such as a knife, scalpel, razor blade, and the like, is typically formed from metal, ceramic, glass or other vitreous material and possesses at least one generally V-shaped cutting edge. In the case of a razor blade, the cutting edge usually possesses a radius of less than about 1,000 angstroms and an included angle of less than 30°. Shaving action can be severe and may result in damage to the blade edge. It has therefore been a common practice to provide the cutting edge of a razor blade with one or more coatings in order to increase the hardness and/or corrosion resistance of the cutting edge, to facilitate shaving with an increase in comfort to the user and/or to achieve some other advantageous result.

Among the coating materials that have been used and/or proposed for coating cutting edges, in particular, those of a razor blade, are thermoplastic materials such as polyethylene, halogenated polymers and telomers (low molecular weight polymers), and the like. See, e.g. in this regard, U.S. Pat. Nos. 3,224,900, 3,518,110, 3,658,742, 5,263,256 and 5,985,459 which disclose various polymeric coatings for cutting edge(s) of razor blades and methods of applying the coatings to the edge(s). The contents of these patents are incorporated by reference herein and are annexed hereto as an integral part of the disclosure of this application.

One method of applying the thermoplastic coating material to the cutting edge(s) of a razor blade involves spraying a suspension of dispersion of the coating material upon the edge(s) and thereafter heating the blade in a non-oxidizing environment to cause the polymeric material to melt and spread evenly over the blade edge surfaces. With the cooling of the blade, the coating material solidifies and remains adhered to the cutting edge(s). Heating the blade to produce this melting has, in general, been accomplished by infrared heating, inductive heating or resistance heating of the blade, e.g., at temperatures of from about 200° C. to about 400° C. Examples of such coating processes are disclosed in e.g., aforesaid U.S. Pat. Nos. 3,224,900, 3,518,110, 3,658,742, 5,263,256 and 5,985,459.

Resistance and inductive heating involve relatively high energy consumption and take a comparatively long time to heat the blades to the required temperatures for melting of the polymer. Since these heating operations result in heating the entire body of the blade including the blade carrier, they consume more heat than would be required to melt just the polymer which is confined to the edge(s) of the blades. Although infrared heating is somewhat faster than resistance or inductive heating (which can take about 60–90 minutes to heat a 12 inch stack of blades), it still requires a fairly long period of time to heat the polymer particles to the melt temperature and a relatively long time to cool the blade body sufficiently for the fused polymer particles to solidify.

In addition to the high energy consumption and processing periods associated with the above-discussed coating methods, such heating may negatively affect the temper of the blades.

Microwave energy has heretofore been used to apply polymeric materials to the surfaces of various substrates. See, e.g., in this regard, U.S. Pat. Nos. 5,422,146, 5,804,801 and 5,879,756. The contents of these patents are incorporated by reference herein and are annexed hereto as an integral part of the disclosure of this invention. However, it is believed that microwave energy has not previously been disclosed for melting fusible coating materials applied to the cutting edges of razor blades or other cutting tools.

It is an object of the invention to provide an improvement in the above-discussed prior art coating methods by applying a coating containing a fusible polymeric material to a cutting edge of an edged tool and fusing (melting) the polymer employing microwave energy as the heat source.

SUMMARY OF THE INVENTION

In accordance with the present invention, the foregoing and other objects are attained by the inventive process which includes applying a coating containing a fusible material to a cutting edge of a cutting too and heating the fusible material employing a source of microwave energy so as to fuse the material into a substantially uniform coating which adhere to the cutting edge.

As a consequence of the foregoing coating method, energy requirements and heating and cooling times required to melt and solidify the fusible material can be significantly reduced.

DETAILED DESCRIPTION OF THE PRESENT INVENTION

The method of the present invention is applicable to all cutting tools and instruments possessing at least one cutting edge wherein such edge is to be coated with fusible polymeric coating. The method of the invention is especially applicable to coating the cutting edge(s) of a razor blade. It is to be understood that the expressions "cutting tool" and "cutting instruments" include cutting tools/instruments per se as well as the cutting edge component from which such tools/instruments are manufactured. In the case of a razor blade, "cutting tools" includes the finished razor blade as well as any cutting edge precursor that may be been used in its manufacture, e.g., a continuous reel featuring at least one cutting edge.

The preparation of the razor blades for coating in the present invention is similar to that employed in the prior art in that the blades are first cleaned with a solvent or detergent to dissolve grease and dirt which may have accumulated on the blades, and to prepare a surface which is receptive to the coating to be applied to the cutting edge(s).

A variety of materials can be used for manufacturing the body of the blades. One of the more common materials is metals, and more particularly, stainless steel. Other useful materials can include ceramics, glasses and other vitreous materials as disclosed, e.g., in U.S. Pat. Nos. 3,543,402, 3,607,485, 3,805,387, 3,831,466, 4,807,360, 5,018,274, 5,048,191, 5,056,227 and 5,121,660. The contents of these patents are incorporated by reference herein and are annexed hereto as an integral part of the disclosure of the application.

After the blades have been washed and dried, they are initially coated with chrome of some other type of thin film before dispersion or suspension of fusible polymeric material, e.g., any of such materials that heretofore have been used or proposed for application to cutting edges, especially those of razor blades. The halocarbon polymers are preferred and of these, Krytox 1000 from E. I. du Pont de Nemorus and Company, Wilmington, Del. is particularly preferred.

The halocarbon polymer is generally present as a powder which is suspended, or dispersed, within a suitable liquid such as an alcohol. The suspension of dispersion can be applied to the cutting edge in any suitable manner, for example, by spraying or dipping. Preheating of the blades may be desirable to facilitate its application to the cutting edge(s) of the blade.

The dispersion or suspension of fusible polymeric materials can be applied to an edge of a continuous strip of blade material before the strip is cut into individual lengths corresponding to the length of a blade. Alternatively, the dispersion or suspension can be applied to the cutting edge(s) of a quantity of blades stacked one upon the another. Once the cutting edge is coated with the dispersion, the edge is subjected to heating in order to melt, or fuse, the fusible polymeric material. The heating operation provides a substantially uniform coating of fused polymer upon the surface of the cutting edge as a continuous thin film. In accordance with the invention, the fusing of the fusible polymeric material is accomplished by exposing the polymeric material to microwave energy.

Microwave energy of suitable power density can be provided by any of several known and conventional microwave generators. Among such generators that can be used herein is a gyrotron which can provide power densities of up to 10,000 KW/inch$^2$ or more. A gyrotron that can advantageously be utilized in the practice of the method of this invention is available from Gyrotron Technology, Inc., Bristol, Pa. and is described in this company's brochure which is incorporated herein by reference and a copy of which is annexed hereto forming an integral part of this application.

Other sources or generators of microwave energy can include, but are not limited to, klystrons and twystrons which can provide variable frequencies capable of melting the sort of polymeric fusible materials that are useful in the practice of the present invention. Examples of such sources of microwave energy are disclosed, e.g., in aforesaid U.S. Pat. No. 5,879,756.

The use of microwave energy to melt the fusible polymer particles has significant advantages over known melting techniques by virtue of the fact that only the exposed outer surface of the blade edge is subjecting to heating, the remainder of the blade body being generally unaffected by the heating operation. The cutting edge(s) of the blade(s) are rapidly heated to the melt temperature of the polymer contained in the coating and maintained at this temperature, generally only for as long as required to achieve fusion of the polymer particles. As those skilled in the art will readily recognize, the heating temperature, the duration of heating and the power settings of the microwave generator will depend upon such factors as the nature and amount of the particular fusible polymer employed, the thickness of the polymer coating and the type of microwave generator utilized. It is, of course, to be understood that the heating temperature and duration of heating must be adjusted in such a manner as to avoid any significant decomposition of the polymer and/or negative impact on the tempering of the blade. Both heating temperature and heating time can be optimized for a particular coating operation employing straight-forward experimental techniques. For many polymers, including, the preferred Krytox 1000-polymer, heating temperatures of from about 300 to 390° C., preferably from about 310 to about 360° C., and heating times of from about 1 to about 60 sec., and preferably from about 5 to about 15 seconds can be used with generally good results.

Once the polymer has fused, the blade(s) are allowed to cool to bring about solidification of the fused polymer. One of the advantages of the method of the invention is that the cooler blade body tends to act as a heat sink resulting in a still more rapid cooling and solidification of the coating that is possible with the prior art processes in which the entire blade body is heated. Cooling can, if desired, be accelerated by rapidly chilling the blade(s), e.g., to a temperature of from about 5° C. to about 20° C.

What is claimed is:

1. A process for applying a coating to a cutting edge of a cutting tool which comprises applying a dispersion or suspension of a fusible material to the cutting edge and heating the fusible material employing a source of microwave energy so as to fuse the fusible material into a substantially uniform coating which adheres to the cutting edge.

2. The process of claim 1 wherein the cutting edge is fabricated from metal.

3. The process of claim 1 wherein the cutting edge is fabricated from ceramic or glass.

4. The process of claim 1 wherein the fusible material is a halogenated polymer.

5. The process of claim 1 wherein the fusible material is a low molecular weight halogenated polymer.

6. The process of claim 1 wherein the fusible material is heated to a temperature of from about 300 to 390° C. for a period of from about 1 to about 60 seconds.

7. The process of claim 1 wherein the fusible material is heated to a temperature of from about 310 to about 360° C. for a period of from about 5 to about 15 seconds.

8. The process of claim 1 wherein the source of microwave energy is a gyrotron providing power densities of up to about 10,000 KW per square inch.

* * * * *

UNITED STATES PATENT AND TRADEMARK OFFICE
CERTIFICATE OF CORRECTION

| | | |
|---|---|---|
| PATENT NO. | : 6,951,668 B2 | Page 1 of 1 |
| DATED | : October 4, 2005 | |
| INVENTOR(S) | : Raymond Guimont and Randy Nicolosi | |

It is certified that error appears in the above-identified patent and that said Letters Patent is hereby corrected as shown below:

<u>Title page,</u>
Item [75], Inventors, please delete the second inventor "Randy Nicolgai" and substitute -- Randy Nicolosi --.

Signed and Sealed this

Twenty-ninth Day of November, 2005

JON W. DUDAS
*Director of the United States Patent and Trademark Office*